(12) United States Patent
Brock et al.

(10) Patent No.: US 8,409,315 B2
(45) Date of Patent: Apr. 2, 2013

(54) MUFFLER

(75) Inventors: John L. Brock, Auburn, MI (US);
Alexander Campbell Thompson, IV,
Rochester Hills, MI (US)

(73) Assignee: Integradigm Corporation, Fort Wayne, IN (US)

( * ) Notice: Subject to any disclaimer, the term of this patent is extended or adjusted under 35 U.S.C. 154(b) by 0 days.

(21) Appl. No.: 13/527,974

(22) Filed: Jun. 20, 2012

(65) Prior Publication Data

US 2012/0255808 A1    Oct. 11, 2012

Related U.S. Application Data

(63) Continuation of application No. 12/802,273, filed on Jun. 3, 2010, now Pat. No. 8,246,704.

(51) Int. Cl.
*B01D 45/12* (2006.01)
(52) U.S. Cl. ............ 55/459.1; 55/447; 55/458; 55/424; 55/426; 55/428; 55/385.3; 95/267; 95/272; 96/383; 96/384; 96/385; 96/386
(58) Field of Classification Search ............. 55/459.1, 55/447, 458, 424, 426, 428, 429, 385.3; 95/267–272; 96/383–386
See application file for complete search history.

(56) References Cited

U.S. PATENT DOCUMENTS

| | | |
|---|---|---|
| 2,790,554 A | 1/1955 | Work |
| 3,219,420 A | 11/1965 | Dielenberg |
| 4,333,754 A | 6/1982 | Peter |
| 4,350,510 A | 9/1982 | Hamada et al. |
| 5,293,744 A | 3/1994 | Imagawa et al. |
| 6,810,557 B2 | 11/2004 | Hansen et al. |
| 6,889,499 B2 | 5/2005 | Bassani |
| 7,331,422 B2 | 2/2008 | Wall |
| 7,380,639 B2 | 6/2008 | Arlasky |
| 7,383,919 B2 | 6/2008 | Arlasky |
| 7,426,980 B2 | 9/2008 | Bassani |
| 7,490,467 B2 | 2/2009 | Cummings |
| 7,708,789 B2 | 5/2010 | Fester |
| 7,918,909 B2 | 4/2011 | McDowell |
| 2005/0011697 A1 | 1/2005 | Arlasky |
| 2005/0011698 A1 | 1/2005 | Bassani |
| 2006/0075745 A1 | 4/2006 | Cummings |
| 2006/0260869 A1 | 11/2006 | Kim et al. |
| 2007/0012511 A1 | 1/2007 | Wall |
| 2007/0266683 A1 | 11/2007 | McDowell |
| 2008/0148722 A1 | 6/2008 | Shirra |
| 2008/0308346 A1 | 12/2008 | Kim et al. |
| 2010/0282538 A1 | 11/2010 | Kim et al. |
| 2011/0079462 A1 | 4/2011 | Furuya et al. |
| 2011/0180347 A1 | 7/2011 | Butler |

FOREIGN PATENT DOCUMENTS

| | | |
|---|---|---|
| JP | 2006077609 | 3/2006 |
| JP | 2008134023 | 6/2008 |

*Primary Examiner* — Jason M Greene
*Assistant Examiner* — Dung H Bui
(74) *Attorney, Agent, or Firm* — Brooks Kushman P.C.

(57) ABSTRACT

A muffler is provided that air or gas flows through to attenuate acoustic oscillations and reduce sound levels. An inner vortex and an outer vortex are created within the device that reduce noise within the rotating flow of gases. The gases flow in the outer vortex from an inlet in a live end of the housing toward a dead end of the housing. A projection is provided in the dead end of the housing that creates a low pressure area that causes the formation of the inner vortex flowing from the dead end toward the live end to an outlet.

22 Claims, 9 Drawing Sheets

MUFFLER

CROSS-REFERENCE TO RELATED APPLICATIONS

This application is a continuation of U.S. application Ser. No. 12/802,273 filed Jun. 3, 2010, the disclosure of which is incorporated in its entirety by reference herein.

TECHNICAL FIELD

The instant invention is a muffler that allows for the flow of air or gas into and out of the muffler. Gases moving through the muffler create at least one vortex within the muffler.

BACKGROUND

Most prior art mufflers that induce a vortex within a chamber use a propeller or impellor to create the vortex. U.S. Pat. No. 7,380,639 issued to Arlasky on Jun. 3, 2008 is an example of the use of a stationary propeller to create a vortex in an exhaust chamber system.

SUMMARY

The disclosed muffler accepts the flow of air or gas in, and will induce a vortex. The inside base of the housing is equipped with a bullet shaped protrusion which assists with the return vortex, reversing the incoming vortex and forcing the air or gas through the outlet. The area at the apex of the bullet creates an area of low pressure while the area around the bullet traps and recirculates the heavier material in a loop around the bullet until the particles are reduced to a finer particle size than those entering the housing, allowing for escape in the outgoing vortex and through the outlet.

The disclosed muffler is an enclosed cylindrical housing having a live end and a dead end, an inside side surface, a dead end inside surface, and a live end inside surface. The muffler is also comprised of an inlet, and outlet and a bullet shaped projection.

The inlet pipe enters through a first opening from the side of the cylindrical housing and near the live end. The outlet pipe exits from a centered opening in the live end of the cylindrical housing. The bullet shaped projection is centered and attached to the inside surface of the dead end.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
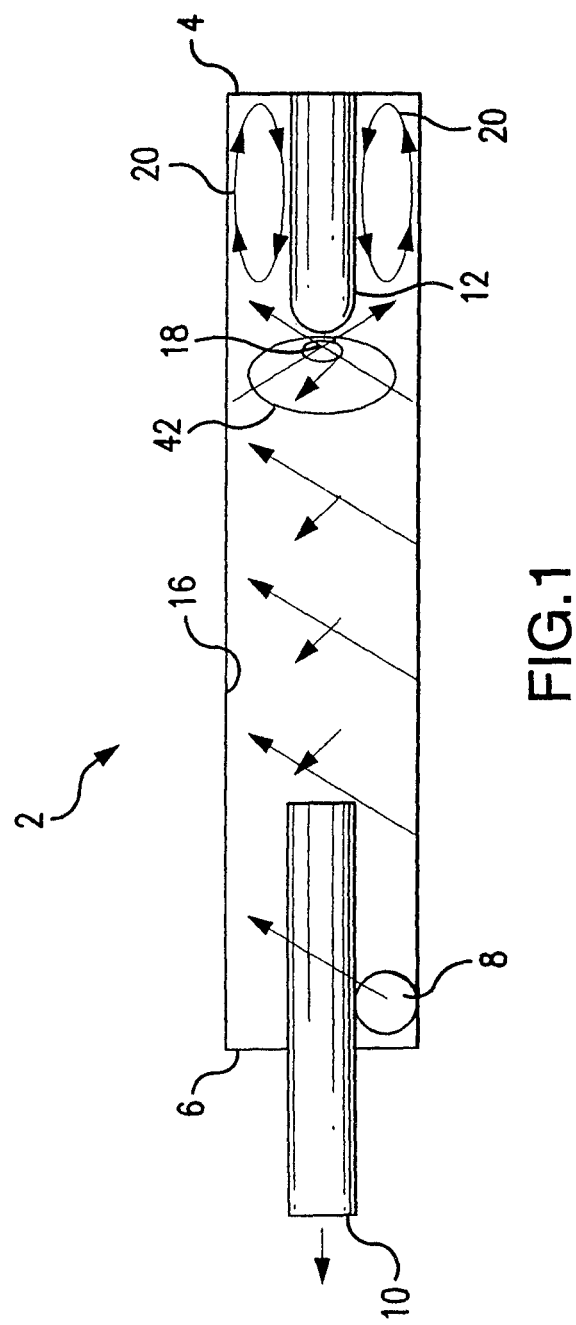
FIG. 1 is an internal view of the muffler.

FIG. 1 is an internal view of the muffler 2. By way of example, when the muffler 2 is attached to a vehicle exhaust system it allows the exhaust gas to flow in through the inlet 8 at the distal end 6. The gas flows into the muffler 2 and immediately begins to spin in a vortex flowing along the inside wall 16 until it reaches the projection or bullet 12. When the gas flowing in the vortex comes into contact with the projection 12 it creates a reverse venturi effect altering the course of the vortex directing the flow of the lighter gas toward the outlet 10 and out of the muffler 2. When the gas comes into contact with the projection 12 a low pressure area 18 develops just off the end of the projection 12. The gas is directed outward toward the inside wall 16 creating a torroidal vortex 42 forcing the gas to accelerate into the inside wall 16. The lighter particles move into the vortex that is expelling the gas and the heavier particles fall. Below this area and along the side of the bullet 12 a circulation is created that traps larger heavier particles and those particles remain entrained until they are reduce to a smaller particle size. This area is called the circulation loop 20. The particles here move up along the bullet where they are sent against the wall again. The particles will remain in this loop until they are small enough to move out. When the particles become small enough, i.e. light enough, to leave the circulation loop 20 they pass through the low pressure zone 18 and become captured in the vortex that removes the particles from the muffler 2.

The particles are reduced within the circulation loop 20 by being repeatedly driven into the inside walls 16 of the muffler 2. These repeated collisions have the ability to, over time, reduce particle size and then release them through the low pressure area 18 and into the vortex for expelling of the gas through the outlet 10.

Figure 2:
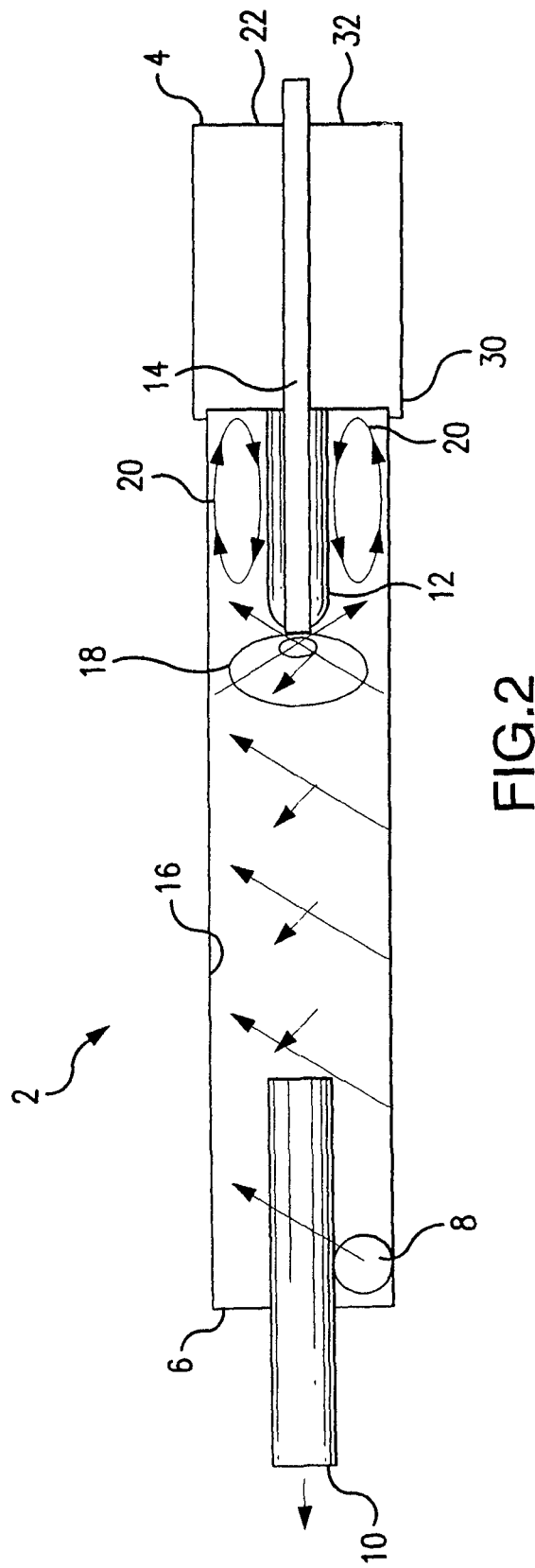
FIG. 2 is an internal view of the muffler with a particle collector and an air flow opening through the bullet or projection.

FIG. 2 is an internal view a muffler with a particle collector 22 and an air flow opening 14 through the bullet or projection 12. The muffler 2 is attached to a vehicle exhaust allowing the exhaust gas to flow in through the inlet 8 at the distal end 6. The gas flows into the muffler 2 and immediately begins to spin in a vortex flowing along the inside wall 16 until it reaches the projection or bullet 12. When the gas flowing into the muffler 2 comes into contact with the projection 12 it creates a reverse venturi effect altering the course of the vortex directing the flow of the lighter gas toward the outlet 10 and out of the muffler 2. When the gas comes into contact with the projection 12, a low pressure area 18 develops just off the end of the projection 12. The gas is directed outward creating a torroidal vortex 42 forcing the gas to accelerate into the inside wall 16. The lighter particles move into the vortex that is expelling the gas and the heavier particles fall. Below this area and alongside of the bullet 12 a circulation is created that traps larger heavier particles where those particles remain entrained until they are reduced to a smaller particle size. This area is called the circulation loop 20. The particles move along the bullet where they are sent against the wall again. The particles will remain in this loop until they are small enough to move out. When the particles become small enough to leave the circulation loop 20 they pass through the low pressure zone 18 and become captured into the vortex that removes the particles from the muffler 2.

This embodiment has an opening 14 that comes in through the near end 4 through the collector 22 and its near end 32 then continuing through the bullet 14. This opening 14 allows for the introduction of various materials into the low pressure zone 18 and into the vortex of the muffler 2. One example of a material that is introduced into the muffler would be cool air to reduce the heat that develops from the engine exhaust.

In addition, there can be a collector 22. The collector 22 serves the purpose of collecting particles that are large and remain in the circulation loop 20. These particles will eventually drop out into the collector 22 through openings 28 in the distal end 30 of the collector 22. In other embodiments the collector 22 is removable and acts as a filter. In other embodiments the collector 22 is baffled to create a resonating affect or is simply used as a resonator 24. It shoould also be noted that, without the openings 28, the particles will remain in the circulation loop 20 until they have been reduced enough to pass through the low pressure zone 18 into the vortex and on to the outlet 10.

Figure 3:
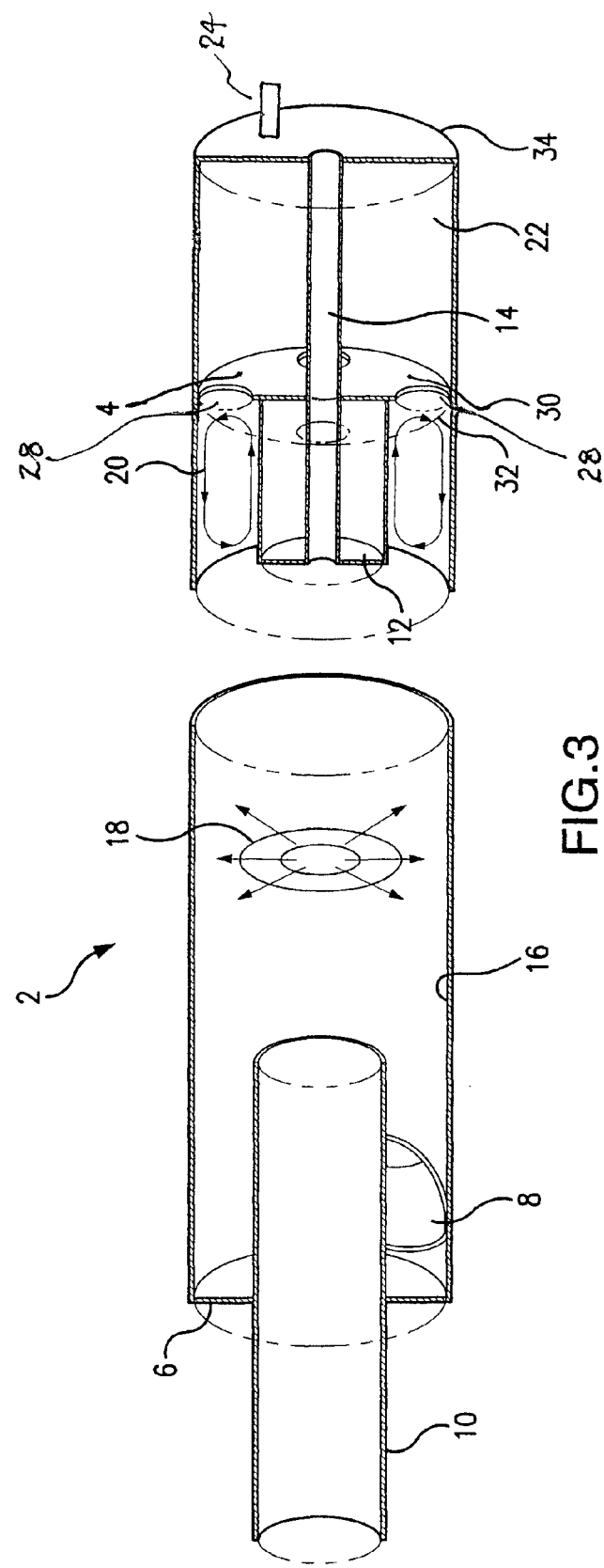
FIG. 3 is an internal view of the muffler with a particle collector and an air flow opening through the bullet or projection.

FIG. 3 is an internal view of the muffler 2 with a particle collector 22 and an air flow opening 14 through the bullet or projection 12. This view allows for a better look at the distal end 30 of the collector 22. The openings 28 in the collector 22 allow the larger heavy particles to drop or fall through into the collector 22.

Figure 4:
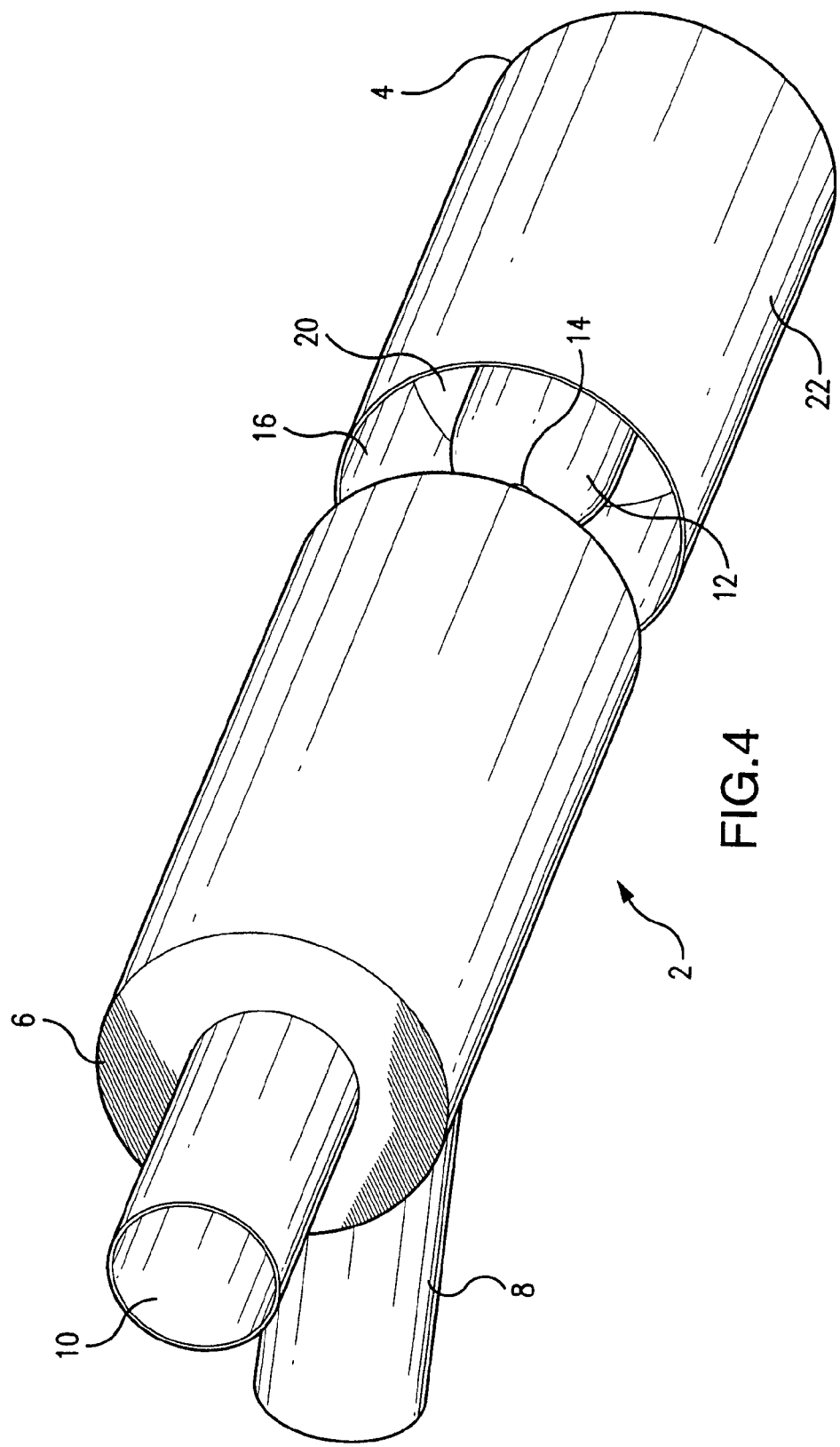
FIG. 4 is a segmental external view of the muffler.

FIG. 4 is a segmental external view of the muffler 2. The inlet 8 and the outlet 10 both pass through the outside surface 34. Both are located near the distal end 6 of the muffler 2. The muffler 2 is self-contained with all operations internal to the muffler 2. The end of the bullet 12 and the opening 14 through it are also visible. This view allows for a better understanding of the area around the bullet 12. This area surrounding the bullet 22 is where the circulation loop 20 exists. The heavier particles become trapped and entrained here. They will recirculate here until they have been reduced or fall into the collector 22.

Figure 5:
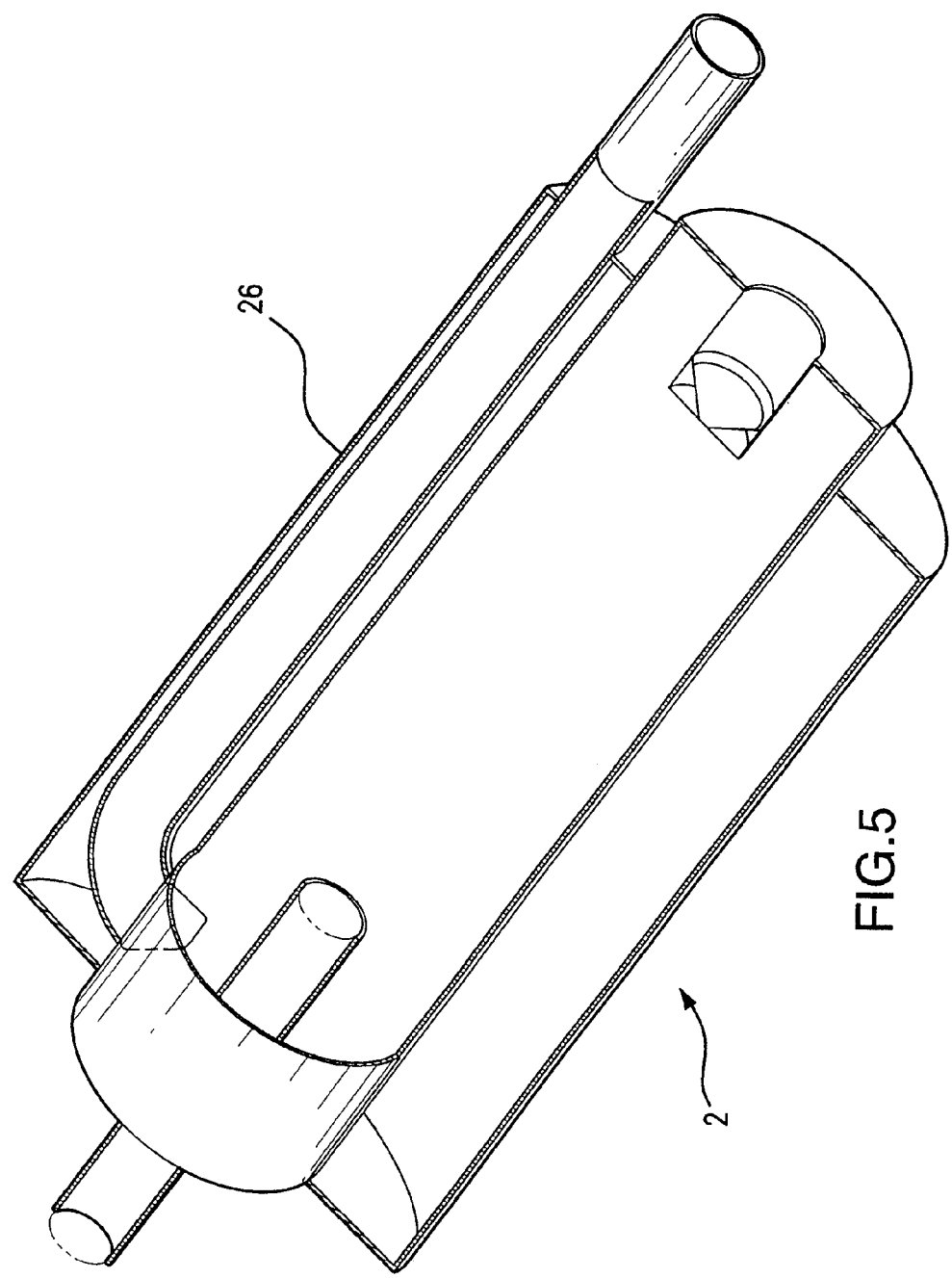
FIG. 5 is an internal view of another embodiment of a muffler.

FIG. 5 is an internal view of another muffler embodiment. In this embodiment the muffler 2 is surrounded by an outer housing 26. This outer housing can be for aesthetic value or incorporated as a larger resonator cavity.

Figure 6:
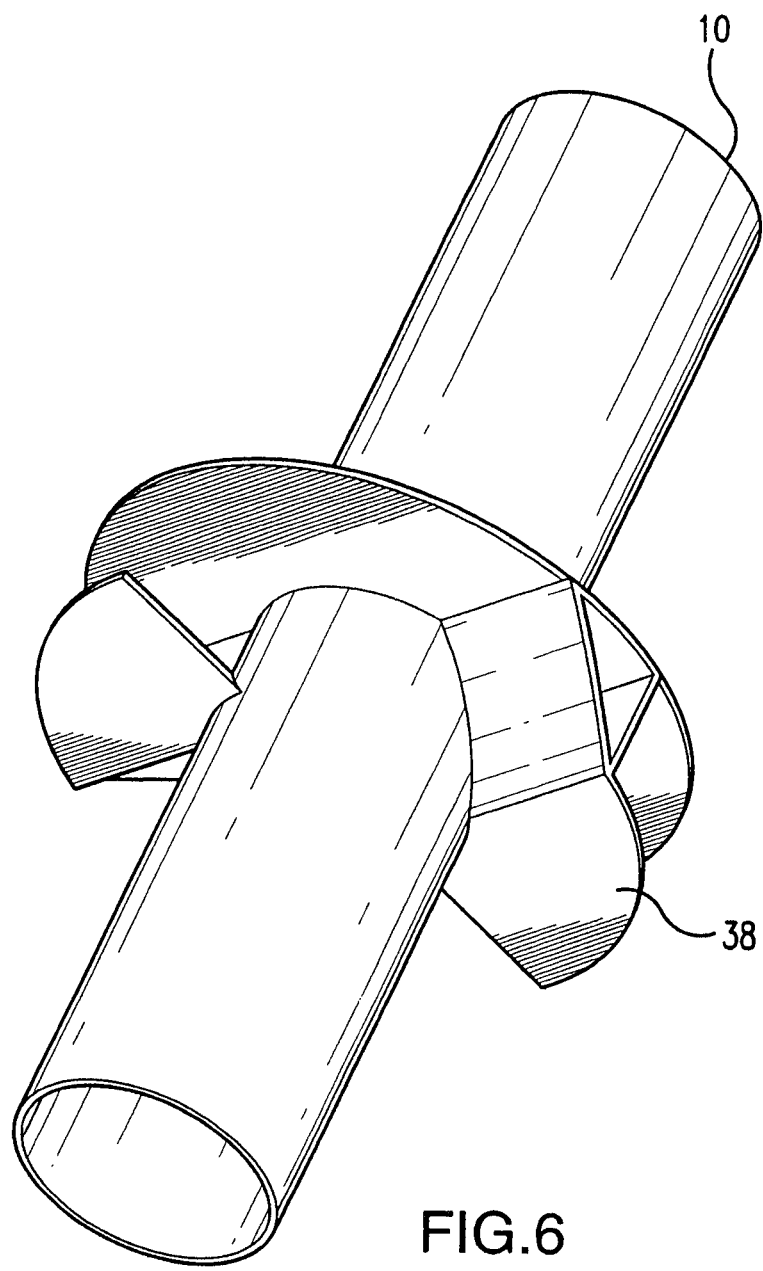
FIG. 6 is another embodiment of the outlet featuring a deflector for the inlet.

FIG. 6 is another embodiment of the outlet 10 featuring a deflector 38 for the inlet 8. This embodiment induces a vortex faster within the muffler 2. This deflector is not necessary to create the vortex but will initiate it faster. The deflector 38 is attached to the outlet 10 adjacent to the inlet 8. The incoming gas hits the deflector and immediately spins into a vortex.

Figure 7:
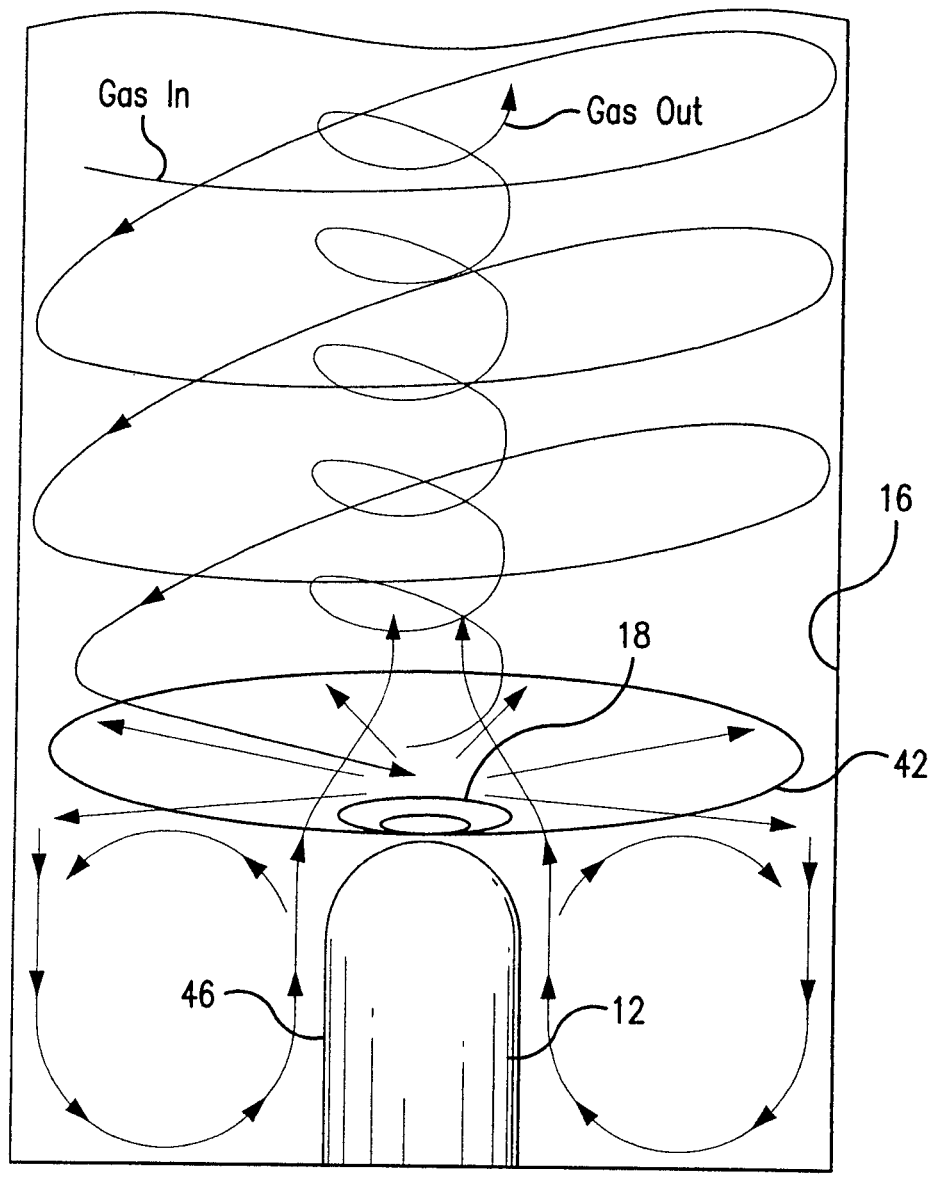
FIG. 7 is a gas flow diagram.

FIG. 7 is a gas flow diagram. The exhaust comes in and circulates down around the inside wall 16. When it reaches the tip of the bullet 12 a low pressure area 18 is created. The lighter particles move up the vortex and the heavier particles are forced out by the torroidal vortex 42. These heavier particles hit the inside wall 16 reducing their size. The heavier particles become entrained in the circulation loop 20 and move down along the inside wall 16 and along the bottom and then up the outside wall 46 of the bullet 12 to be reintroduced into the torroidal vortex 42 or as smaller particles they leave. The particles that are too large remain in the loop 20 until they are reduced in size enough to pass through the low pressure zone 18 and out of the muffler 2.

Figure 8:
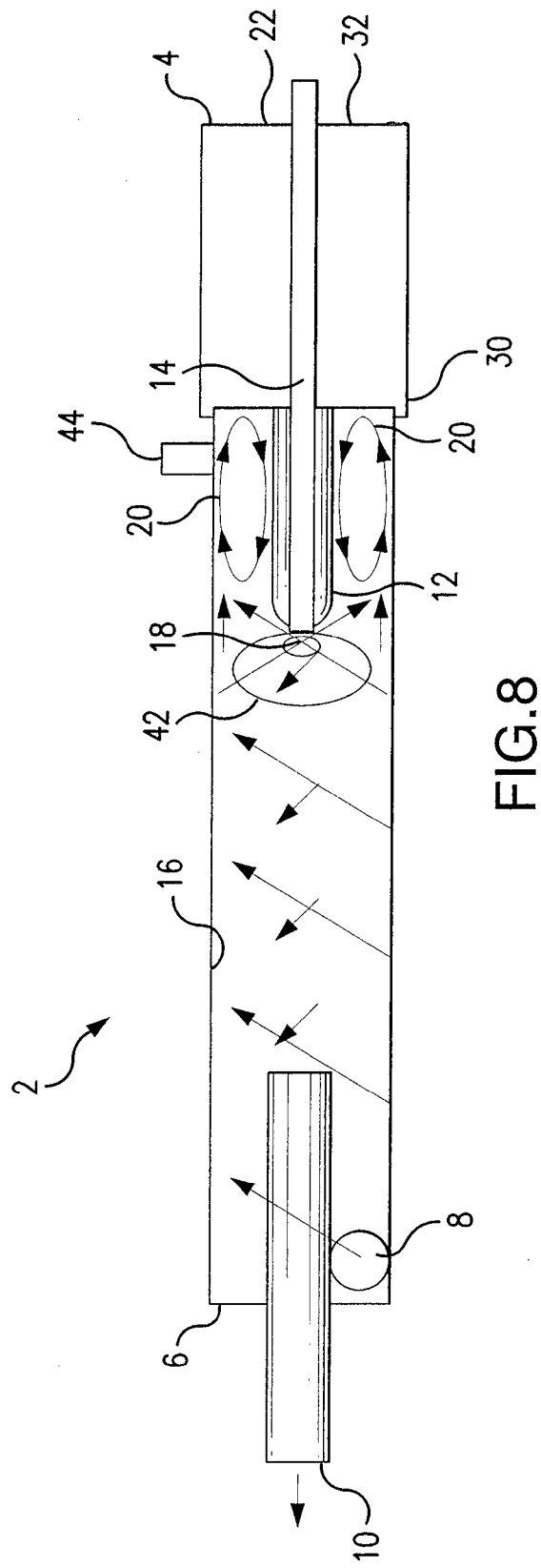
FIG. 8 is an embodiment of the muffler featuring a recovery outlet to recycle unused fuel.

FIG. 8 is another embodiment of the muffler 2 featuring a recovery outlet 44 to recycle unused fuel or hydrocarbon. This embodiment is ideal for use as a muffler for a diesel motor because it has a recirculation loop 40. The heavier particles that are within the circulation loop 20 are drawn off and reintroduced into the combustion cycle to be burned again. This improves emission control and increases mileage.

Figure 9:
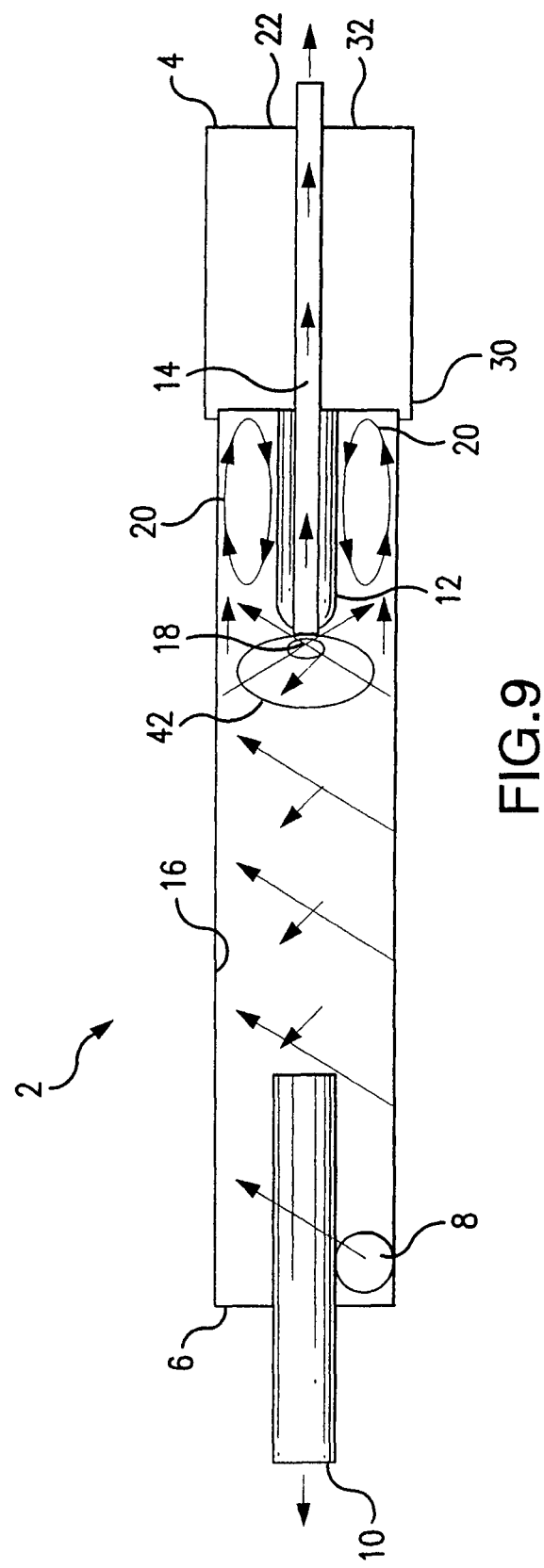
FIG. 9 is another embodiment of the muffler featuring a recovery outlet to recycle unused fuel.

FIG. 9 is another embodiment of the muffler featuring a recovery outlet 44 to recycle unused fuel. In this embodiment the recovery outlet is the opening 14 in the projection 12. The heavier particles are drawn off through the opening 14 in the bullet 12 and reintroduced into the combustion cycle.

The muffler 2 is also capable of being used in other applications with any motor or process that creates an exhaust. The muffler 2 is used in a coal fired power generation process when attached to the exhaust created by the process and the gas will flow into the inlet 8 of the distal end 6 allowing the exhaust gas to flow in through the inlet 8 at the distal end 6. The gas flows into the muffler 2 and immediately begins to spin in a vortex flowing along the inside wall 16 until it reaches the projection or bullet 12. When the gas flowing into the muffler 2 comes into contact with the projection 12 it creates a reverse venturi effect altering the course of the vortex in an upward manner directing the flow of the lighter gas toward the outlet 10 and out of the muffler 2. When the gas comes into contact with the projection 12 a low pressure area 18 develops just off the end of the projection 12. The gas is directed outward creating a torridal vortex forcing the gas to accelerate into the inside wall 16. The lighter particles move into the vortex that is expelling the gas and the heavier particles fall. Below this area and along side of the bullet 12 a circulation is created that traps larger heavier particles where those particles remain entrained until they are reduce to a smaller particle size. This area is called the circulation loop 20. The particles here move up along the bullet where they are sent against the wall again. The particles will remain in this loop until they are small enough to move out. When the particles become small enough to leave the circulation loop 20 they pass through the low pressure zone 18 and become captured into the vortex that removes the particles from the muffler 2. The exhaust is therefore cleaned as heavier particles are either reduced or removed in the manner explained previously.

The muffler 2 reduces the sound level within the housing and in gases flowing out of the outlet. A muffler may be defined as a device that decreases the amplitude of acoustical oscillations. The muffler reduces sound levels in the housing by the operation of the inner and outer vortices. Sound is attenuated by the vortices due to shear layer and boundary layer dispersion of the sound of the gas flow.

The generally open nature of muffler has the advantage of reducing back pressure compared to conventional baffle style mufflers. The muffler acts as a tuned device, also known as a tuned muffler that results in improved scavenging of the combustion chambers of a combustion engine. Generally, tuned mufflers are individually tuned for each cylinder because the exhaust valves for each cylinder open at different times. With the disclosed muffler, there is no need to tune for each cylinder individually due to the way that the vortices operate to reduce the sound levels by attenuation.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A muffler that receives exhaust gases from a combustion engine of a vehicle, the muffler comprising:

an elongated housing having a live end defining an outlet opening, an inlet opening, an opposed dead end and a tubular side wall having an inside surface therebetween;

an outlet pipe extending from the live end into the housing to an open end of the outlet pipe;

the inlet opening being provided in the housing between the live end and the open end of the outlet pipe; and wherein the exhaust gases flow through the inlet opening into the housing and form an outer vortex along the inside surface flowing toward the dead end, the direction of the flow of exhaust gases reversing in the dead end to flow back toward the live end and into the open end of the outlet pipe.

2. The muffler of claim 1 further comprising a projection disposed in the dead end of the housing that creates an area of low pressure in the dead end, wherein the direction of flow of the exhaust gases is reversed when the exhaust gases are drawn into the area of low pressure and are then expelled from the area of low pressure.

3. The muffler of claim 1 further comprising a projection attached to the dead end that extends from the dead end into the housing.

4. The muffler of claim 3 wherein the projection is bullet shaped with a convex rounded end.

5. The muffler of claim 1 wherein the inlet opening is formed in the inside wall.

6. The muffler of claim 1 wherein the exhaust gases that flow back toward the live end flow in an inner vortex that is inside the outer vortex.

7. The muffler of claim 6 wherein no internal walls are disposed between the outer vortex and the inner vortex.

8. The muffler of claim 1 further comprising a resonator chamber housing the elongated housing.

9. A muffler that receives exhaust gases from a combustion engine of a vehicle, the muffler comprising:

an axially elongated housing having a live end defining an outlet opening and an inlet opening, a dead end axially spaced from the live end, and a tubular side wall having an inside surface;

an outlet pipe extending axially from the outlet opening into the housing away from the live end forming an open end;

a projection disposed in the dead end of the housing and extending axially toward the live end to create an area of low pressure adjacent the dead end;

the inlet opening being provided adjacent the side wall of the housing between the live end and the open end of the outlet pipe; and wherein the exhaust gases flow through the inlet opening into the housing and form an outer vortex flowing along the inside surface toward the dead end, the exhaust gases are drawn into the area of low pressure and are expelled from the area of low pressure with the direction of the flow of exhaust gases being reversed to flow toward the live end and into the open end of the outlet pipe.

10. The muffler of claim 9 wherein the projection is bullet shaped with a convex rounded end.

11. The muffler of claim 9 wherein the inlet opening is formed in the side wall.

12. The muffler of claim 9 wherein the exhaust gases that flow back toward the live end flow in an inner vortex that is inside the outer vortex.

13. The muffler of claim 12 wherein no internal structural walls or baffles are disposed between the outer vortex and the inner vortex.

14. The muffler of claim 9 further comprising a resonator chamber attached to the axially elongated housing.

15. A muffler that receives exhaust gases from a combustion engine of a vehicle, the muffler comprising:

a housing having a live end defining an outlet opening and an inlet opening, a dead end and a wall having an inside surface;

an outlet pipe extending from the outlet opening into the housing to an open end of the outlet pipe;

the inlet opening being provided in the housing between the live end and the open end of the outlet pipe; and wherein the exhaust gases flow through the inlet opening into the housing and flow in an outer vortex along the inside surface toward the dead end, the direction of the flow of exhaust gases reversing in the dead end to flow back toward the live end and into the open end of the outlet pipe.

16. The muffler of claim 15 further comprising a projection disposed in the dead end of the housing that creates an area of low pressure in the dead end, wherein the direction of flow of the exhaust gases is reversed when the exhaust gases are drawn into the area of low pressure and are then expelled from the area of low pressure.

17. The muffler of claim 15 further comprising a projection attached to the dead end that extends from the dead end into the housing.

18. The muffler of claim 17 wherein the projection is bullet shaped with a convex rounded end on the open end of the projection.

19. The muffler of claim 15 wherein the inlet opening is formed in the wall.

20. The muffler of claim 15 wherein the exhaust gases that flow back toward the live end flow in an inner vortex that is inside the outer vortex.

21. The muffler of claim 20 wherein no structure is disposed between the outer vortex and the inner vortex.

22. A muffler that receives exhaust gases from a combustion engine of a vehicle, the muffler comprising:

a housing having a live end defining an outlet opening and an inlet opening, a dead end and a wall having an inside surface;

an outlet pipe extending from the outlet opening into the housing to an open end of the outlet pipe;

a projection disposed in the dead end of the housing that creates an area of low pressure in the dead end;

the inlet opening being provided in the housing between the live end and the open end of the outlet pipe;

wherein the exhaust gases flow through the inlet opening into the housing and flow in an outer vortex along the inside surface toward the dead end, the exhaust gases are drawn into the area of low pressure and is expelled from the area of low pressure with the direction of the flow of exhaust gases being reversed to flow toward the live end and into the open end of the outlet pipe.

* * * * *